US009085660B2

(12) United States Patent
Quintana et al.

(10) Patent No.: US 9,085,660 B2
(45) Date of Patent: Jul. 21, 2015

(54) BLENDS OF A POLYLACTIC ACID AND A WATER SOLUBLE POLYMER

(75) Inventors: Robert Quintana, Mons (BE); Olivier Persenaire, Mons (BE); Leila Bonnaud, Mons (BE); Philippe Dubois, Mons (BE); Yahia Lemmouchi, London (GB)

(73) Assignee: British American Tobacco (Investments) Limited, London (GB)

( * ) Notice: Subject to any disclaimer, the term of this patent is extended or adjusted under 35 U.S.C. 154(b) by 0 days.

(21) Appl. No.: 14/008,968

(22) PCT Filed: Mar. 29, 2012

(86) PCT No.: PCT/GB2012/050697
§ 371 (c)(1),
(2), (4) Date: Nov. 27, 2013

(87) PCT Pub. No.: WO2012/131370
PCT Pub. Date: Oct. 4, 2012

(65) Prior Publication Data
US 2014/0080968 A1    Mar. 20, 2014

(30) Foreign Application Priority Data

Mar. 31, 2011    (GB) .................................... 1105455.8

(51) Int. Cl.
*A24D 3/10*    (2006.01)
*A24D 3/06*    (2006.01)
(Continued)

(52) U.S. Cl.
CPC .............. *C08G 63/912* (2013.01); *A24D 3/068* (2013.01); *A24D 3/08* (2013.01); *C08J 5/18* (2013.01);
(Continued)

(58) Field of Classification Search
CPC ......... C08L 67/04; C08L 29/04; C08L 1/284; C08G 63/912; A24D 3/068; A24D 3/08
USPC ..................................... 524/557, 37; 131/332
See application file for complete search history.

(56) References Cited

U.S. PATENT DOCUMENTS 2,813,051 A * 11/1957 Machenry ...................... 156/201
3,407,822 A * 10/1968 Touey et al. ................... 131/332
(Continued)

FOREIGN PATENT DOCUMENTS

CA        2653637 A1    11/2007
CN        1817937 A      8/2006
(Continued)

OTHER PUBLICATIONS

International Search Report and Written Opinion mailed Jun. 18, 2012 for International Patent Application No. PCT/GB2012/050697, filed Mar. 29, 2012.
(Continued)

*Primary Examiner* — John Uselding
(74) *Attorney, Agent, or Firm* — NW Poulsen; LA Pinol (57) ABSTRACT

The present invention relates to water-dispersive biodegradable compositions which may be formed into films and fibers. The present invention also relates to polymer blends comprising polylactide and water-soluble polymers. More particularly, the present invention relates to the use of grafted copolymers (PLA-grafted water-soluble polymers) for the compatibilization of PLA and water-soluble polymers. Such reactive compatibilization of immiscible polymer blends is achieved in such a way that main blend components are covalently bonded. In addition, such reactive compatibilization can be carried out by reactive extrusion.

19 Claims, 4 Drawing Sheets

(51) Int. Cl.
  *C08G 63/91* (2006.01)
  *A24D 3/08* (2006.01)
  *C08J 5/18* (2006.01)
  *C08L 67/04* (2006.01)
  *D01F 6/50* (2006.01)
  *D01F 6/92* (2006.01)
  *D01F 1/02* (2006.01)
  *C08L 1/28* (2006.01)
  *C08L 5/00* (2006.01)
  *C08L 29/04* (2006.01)
  *C08L 51/08* (2006.01)

(52) U.S. Cl.
  CPC . *C08L 67/04* (2013.01); *D01F 1/02* (2013.01); *D01F 6/50* (2013.01); *D01F 6/92* (2013.01); B01D 2239/0266 (2013.01); C08J 2301/28 (2013.01); C08J 2305/00 (2013.01); C08J 2329/04 (2013.01); C08J 2367/04 (2013.01); C08J 2401/28 (2013.01); C08J 2405/00 (2013.01); C08J 2429/04 (2013.01); C08J 2451/08 (2013.01); C08J 2467/04 (2013.01); C08L 1/28 (2013.01); C08L 1/284 (2013.01); C08L 1/286 (2013.01); C08L 5/00 (2013.01); C08L 29/04 (2013.01); C08L 51/08 (2013.01)

(56) References Cited

U.S. PATENT DOCUMENTS

| | | |
|---|---|---|
| 4,620,999 A | 11/1986 | Holmes |
| 4,826,493 A | 5/1989 | Martini et al. |
| 5,200,247 A | 4/1993 | Wu et al. |
| 5,216,050 A | 6/1993 | Sinclair |
| 5,252,642 A | 10/1993 | Sinclair et al. |
| 5,360,892 A | 11/1994 | Bonsignore et al. |
| 5,410,016 A | 4/1995 | Hubbell et al. |
| 5,434,241 A | 7/1995 | Kim et al. |
| 5,472,518 A | 12/1995 | Patnode et al. |
| 5,508,101 A | 4/1996 | Patnode et al. |
| 5,567,510 A | 10/1996 | Patnode et al. |
| 5,654,381 A | 8/1997 | Hrkach et al. |
| 5,883,199 A | 3/1999 | McCarthy et al. |
| 5,945,480 A | 8/1999 | Wang et al. |
| 5,952,433 A | 9/1999 | Wang et al. |
| 6,075,118 A | 6/2000 | Wang et al. |
| 6,201,068 B1 | 3/2001 | Tsai et al. |
| 6,475,418 B1 | 11/2002 | Tsai et al. |
| 6,571,802 B1 | 6/2003 | Yamashita |
| 2002/0128384 A1 | 9/2002 | Wang et al. |
| 2003/0055206 A1* | 3/2003 | Haile et al. ............ 528/272 |
| 2003/0118850 A1 | 6/2003 | McCormack et al. |
| 2007/0260019 A1* | 11/2007 | Ohme et al. ............ 525/400 |
| 2009/0288669 A1* | 11/2009 | Hutchens ............... 131/274 |
| 2009/0312493 A1 | 12/2009 | Huang et al. |
| 2011/0065573 A1 | 3/2011 | McEneany et al. |

FOREIGN PATENT DOCUMENTS

| | | |
|---|---|---|
| CN | 1834134 A | 9/2006 |
| CN | 1961765 A | 5/2007 |
| CN | 101742293 A | 6/2010 |
| DE | 4013293 A1 | 11/1991 |
| EP | 0654504 A2 | 5/1995 |
| EP | 0704470 A2 | 4/1996 |
| EP | 1609819 A1 | 12/2005 |
| JP | 61-42127 A | 11/1992 |
| NL | 9301996 A | 6/1995 |
| TW | 201000701 A | 1/2010 |
| WO | 9204413 A1 | 3/1992 |
| WO | 9400163 A1 | 1/1994 |
| WO | 9504108 A1 | 2/1995 |
| WO | 9621057 A1 | 7/1996 |
| WO | 9829506 A1 | 7/1998 |
| WO | 9906456 A1 | 2/1999 |
| WO | 9923163 A1 | 5/1999 |
| WO | 0168157 A1 | 9/2001 |
| WO | 0216468 A1 | 2/2002 |
| WO | 0228444 A2 | 4/2002 |
| WO | 02053641 A1 | 7/2002 |
| WO | 02074352 A1 | 9/2002 |
| WO | 02085969 A2 | 10/2002 |
| WO | 02085970 A2 | 10/2002 |
| WO | 03105661 A2 | 12/2003 |
| WO | 2004087812 A1 | 10/2004 |
| WO | 2006121599 A1 | 11/2006 |
| WO | 2007135037 A1 | 11/2007 |
| WO | 2008132488 A1 | 11/2008 |
| WO | 2009016513 A2 | 2/2009 |

OTHER PUBLICATIONS

International Preliminary Report on Patentability mailed Jun. 24, 2013 for International Patent Application No. PCT/GB2012/050697, filed Mar. 29, 2012.

Sigma-Aldrich Material Safety Data Sheet for 2,5-Bis(Tert-Butylperoxy)-2,5-Dimethylhexane, Tech., 90% (Luperox 101), updated Sep. 4, 2007.

Search Report, dated Jul. 23, 2014, for CN Application No. 201280016639.8, filed Mar. 29, 2012.

* cited by examiner

BLENDS OF A POLYLACTIC ACID AND A WATER SOLUBLE POLYMER

CLAIM FOR PRIORITY

This application is a National Stage Entry entitled to and hereby claiming priority under 35 U.S.C. §§365 and 371 to corresponding PCT Application No. PCT/GB2012/050697, filed Mar. 29, 2012, which in turn claims priority to GB Application No. 1105455.8, filed Mar. 31, 2011. The entire contents of the aforementioned applications are herein expressly incorporated by reference.

TECHNICAL FIELD

The present invention relates to water-dispersive biodegradable compositions which may be formed into films and fibres. The present invention also relates to polymer blends comprising polylactide and water-soluble polymers.

More particularly, the present invention relates to the use of grafted copolymers (PLA-grafted water-soluble polymers) for the compatibilization of PLA and water-soluble polymers. Such reactive compatibilization of immiscible polymer blends is achieved in such a way that the main blend components are covalently bonded. In addition, such reactive compatibilization can be carried out by reactive extrusion.

BACKGROUND

For disposable products, it is desirable to use materials which are both biodegradable and water-dispersive.

Biodegradable polymers disposed of in bioactive environments degrade by the enzymatic action of microorganisms such as bacteria, fungi and algae. Their polymer chains may also be cleaved by non-enzymatic processes such as chemical hydrolysis. As used herein, the term "biodegradable" means that the composition degrades within one year using the standard test method for determining aerobic biodegradation of plastic materials under controlled composting conditions.

As used herein, the term "water-dispersible" means that the composition dissolves or breaks into pieces smaller than 0.841 mm (20 mesh) after being immersed in water for approximately 24 hours at room temperature.

Poly(lactic acid) or polylactide (PLA), is an attractive biodegradable and biocompatible polymer. It is derived from renewable resources (e.g., corn, wheat, or rice) and it is biodegradable, recyclable, and compostable. In addition, PLA exhibits excellent processability. Actually, PLA has better thermal processability compared to other biodegradable such as poly(hydroxyalkanoates) (PHAs), poly($\epsilon$-caprolactone) (PCL), etc. It can be processed by injection moulding, film extrusion, blow moulding, thermoforming, fibre spinning, and film forming. However, the use of PLA can be restricted due to the fact that it is a hydrophobic polymer and is not able to solubilise or disperse in water.

Water-soluble biodegradable polymers may be synthesized by modifying starch and cellulose. For example, carboxymethyl cellulose (CMC) having different degrees of carboxymethyl substitution is a family of marketed water-soluble polymers. Hydroxyethyl cellulose (HEC), hydroxypropyl cellulose (HPC), methyl cellulose (MC) and ethyl cellulose (EC) are used as binders, water retention aids, thickeners, film formers, lubricants, or rheology modifiers. Water-soluble polysaccharides are also produced by microbial fermentation. Xanthan is the most widely used microbial polysaccharide. Industrial uses of xanthan include oil recovery (viscosity control), paper manufacturing, agriculture (stimulation of plant growth), and cosmetics. Pullulan has also shown various potential applications. For example, its good moisture retention and low oxygen permeability has led to its use as edible films for food packaging.

To date, poly(vinyl alcohol) (PVOH) is the only polymer with exclusively carbon atoms in the main chain that is regarded as biodegradable. It is currently used in textiles, paper and packaging industries as paper coatings, adhesives, and films. Importantly, PVOH is water soluble.

A disadvantage associated with water-soluble biodegradable polymers is that they are unduly sensitive to water, which limits their use for most of the conventional polymer applications. It is therefore desirable to provide a material that may be used in the manufacture of disposable articles and which is water-responsive. Preferably, such material should be versatile and inexpensive to produce. It is also desirable for the material to be stable enough for defined applications but subject to degradation under predetermined conditions.

The use of polymers for the production of water-dispersive articles is known in the art. Mainly, compositions comprising multilayer polymer films are reported. Indeed, there are many examples of multilayer films that are utilized in disposable objects. Most of these examples consist of films or fibres which comprise external layers of an environmentally degradable polymer and an internal layer of a water-responsive polymer. The utility of such structures lies in the adjustment of physical properties in order to increase the stability or lifetime of such structure. For example U.S. Pat. No. 4,826,493 describes the use of a thin layer of hydroxybutyrate polymer as a component of a multilayer structure as a barrier film.

Another example of the use of multilayer films is U.S. Pat. No. 4,620,999, which describes the use of a water soluble film coated with, or laminated to, a water insoluble film as a disposable bag. A similar type of bag is disclosed in JP 61-42127. It is composed of an inner layer of water-resistant water-dispersible resin such as polylactide and an outer layer of polyvinyl alcohol. These examples, however, are all limited to compositions consisting of layers of different polymers, and do not encompass actual blends of different polymers.

Other water-responsive articles are disclosed in U.S. Pat. No. 5,508,101, U.S. Pat. No. 5,567,510, and U.S. Pat. No. 5,472,518. These patents disclose a series of water-responsive compositions comprising a hydrolytically degradable polymer and a water soluble polymer. The articles are, however, constructed from polymers which are first formed into fibres or films and then combined. Therefore, although the fibres and films of the polymers of such compositions are in very close proximity, they are not actual blends.

Polymer blending is an attractive approach to the tailoring of the properties of polymeric materials without having to invest in new chemistry. Among the different blend morphologies, co-continuous polymer blends exhibit the best performance improvements because both components can fully contribute to the properties of the blend. However, poor interface between the different polymeric phases of the blend usually leads to a significant loss of properties and, more specifically, a deterioration in mechanical performance is observed. To overcome this problem, traditionally compatibilizers are used to strengthen the interface. In this field, the technique of reactive compatibilization is a very attractive and economical route to achieve stable, multiphase polymer blends.

For most binary polymer blends, the appropriate reactive groups are not present and functionalisation of the blend components is required. However, for some binary polymer blends, a reactive polymer can be added as compatibilizer precursor which is miscible with one of the blend components and reactive towards the other. This type of blend compatibilization can be advantageously achieved by reactive extrusion.

Reactive extrusion (REX) is a polymer processing technique that mainly involves the use of an extruder as a chemical reactor. Polymerization and other chemical reactions such as reactive compatibilization are carried out in situ, while processing is in progress. Therefore, REX differs from conventional polymer manufacturing methods, where synthesis is a separate operation and the extruder serves only as a processing aid.

U.S. Pat. No. 5,945,480 discloses components of flushable personal care products manufactured using fibres based on blends of polyvinyl alcohol and polylactide. The blend components are compatibilized by means of polylactide modified with 2-hydroxyethyl methacrylate (HEMA). Although the disclosed invention aims to improve the compatibility of the blended polymers, there is no reference to reactive compatibilization. Actually, only hydrogen bonding between hydroxyl groups of HEMA and polyvinyl alcohol can be expected. The examples, which do not describe the formation of any chemical covalent bond for promoting blends compatibility, do not correspond to actual reactive compatibilization procedures.

Polymer blend compositions for making fibres and films that are optimally combined are desirable because they are highly stable. Optimal combination of polymers means that the polymer interface is improved in such a way that the polymer blends exhibit co-continuous morphology. This may be achieved by means of reactive extrusion. Tailored blend properties can be obtained by the judicious choice of reactive compatibilizers. Although blended polymer compositions are known, reactively compatibilized co-continuous polymer blends are desirable since the resulting composition is more stable and versatile.

In light of the foregoing, it is desirable to produce biodegradable and water-dispersive polymer blends, preferably which can be easily processed to produce films and fibres. It is also desirable to provide thermally processable polymer blends which have good mechanical and physical properties.

SUMMARY OF THE INVENTION

According to a first aspect of the present invention, a water-dispersive and biodegradable composition is provided, comprising a blend of polylactide and a water soluble polymer, wherein the blend further comprises a reactive compatibilizer in an amount sufficient to compatibilize the blend.

In second and third aspects of the present invention films and fibres are provided, respectively, formed from the water-dispersive and biodegradable composition according to the first aspect.

In a further aspect, a method of preparing a composition of the first aspect is provided, the method comprising: preparing a reactive compatibilizer by reactive extrusion of polylactide and maleic anhydride, and melt blending said compatibilizer with polylactide and a water soluble polymer.

In another aspect of the invention, filter material and filter elements are provided, comprising the fibres according to the third aspect of the invention. Smoking articles are also provided, including such filter material or such filter elements.

In a yet further aspect of the invention, there is provided the use of a reactive compatibilizer in the reactive compatibilization of PLA and a water-soluble polymer, whereby the PLA and water soluble polymer become covalently bonded.

DETAILED DESCRIPTION OF THE INVENTION

The invention provides polymeric compositions with good mechanical properties, such as strength and good processability, whilst also being water-dispersive and biodegradable. This means that these compositions may be used to make materials, such as films and fibres, which are suitable for use in disposable items which are used for a relatively short period of time and are then discarded.

The films and fibres are useful as components of disposable products such as packaging films, nonwovens tissues, etc. The water-dispersive films and fibres according to the present invention have the unique advantage of being biodegradable so that the films or fibres and articles made from the films or fibres can be easily degraded.

One particular application of such materials is in smoking articles which are stored in relatively stable conditions and are then quickly used and discarded. It is desirable for the remaining elements of the spent smoking article, in particular the filter element, to dissociate and disperse quickly under normal environmental conditions, and for the constituent parts to biodegrade.

A composition comprising polylactide and one or more water-soluble biodegradable polymers may be formed into various products, including films and fibres using standard processes known in the art. This is possible because the polymer blends of the present invention are compatibilized and exhibit excellent processability.

Compatibilization refers to a process of modification of the interfacial properties of an immiscible polymer blend. Compatibilization allows for the production of immiscible polymer blends having a modified interface and/or morphology, wherein the two immiscible polymers are stabilized either by covalent or ionic bond formation between phases, or by attractive intermolecular interaction (e.g., dipole-dipole, ion-dipole, charge-transfer, H-bonding or van der Waals forces, etc.). Reactive compatibilization of immiscible polymer blends is a method used to obtain well dispersed and stabilized phase morphologies. It is based on the in situ formation of block- or graft copolymer at the interface between the phases of the polymer blend during melt blending. In some cases, a third polymer, which is miscible with one of the blend components and reactive with the other can be used for the formation of a compatibilizing copolymer at the interface. In the present invention, the reactive compatibilization of immiscible polymer blends is ensured by the fact that main blend components are covalently bonded.

The polylactide (PLA) used in the present invention may be produced by different synthetic methods, such as ring-opening polymerization of lactide or direct condensation polymerization from lactic acid. One commercially available poly(lactic acid) (PLA, 4032D) which may be used in the invention is a commercial grade supplied by NatureWorks LLC (USA), with a number average molecular weight (Mn (PLA)) of 58,000 g/mol, a D-isomer content of approximately 1.5% and a polydispersity index of 2.1. Any PLA grade can be selected for use in this invention, and the molecular weights of the PLA may vary depending on the desired properties and use. Poly(L-lactide) (PLLA) is preferred due to its crystallinity, which is beneficial for the production of fibres.

The water-soluble polymers used in the present invention are preferably biodegradable. Biodegradable water-soluble polymers containing reactive groups such as hydroxyl or amine functions are appropriate for this invention. Preferred biodegradable water-soluble polymers include polyvinyl alcohol (PVOH), carboxymethyl cellulose (CMC), hydroxyethyl cellulose (HEC), hydroxypropyl cellulose (HPC), methyl cellulose (MC) and ethyl cellulose (EC), hydroxyethyl methacrylate (HEMA), xanthan and pullulan, or blends thereof. More preferably, the biodegradable water-soluble polymers are PVOH or HEC. It is expected that a wide range of biodegradable water-soluble polymers would be capable of imparting the same effects as PVOH and HEC to PLA and would be effective in the present invention.

Polymer blends of the invention preferably contain from 30 to 70 wt % of biodegradable water-soluble polymer. More preferably, the polymer blends contain 40 to 60 wt %, and most preferably 45 to 55 wt % of biodegradable water-soluble polymer.

Compatibilization is ensured by the use of grafted copolymers (PLA-grafted water-soluble polymers) for the compatibilization of PLA and water-soluble polymers. Actually, the preferred reactive compatibilizer, namely maleic anhydride-grafted polylactide (MA-g-PLA), is reactive towards the hydroxyl groups of the selected water soluble polymer (for instance, HEC or PVOH), leading to the formation of PLA-grafted water-soluble polymers which are able to improve the quality of the interface between PLA and the selected water soluble polymer. Therefore, such reactive compatibilization of immiscible polymer blends is achieved in such a way that the main blend components are covalently bonded.

Most biodegradable water soluble polymers present hydroxyl groups. Thus, the selected reactive group has to be able to be easily grafted to PLA and must be reactive towards hydroxyl functions.

The method for making the preferred reactive compatibilizer, namely maleic anhydride-grafted polylactide (MA-g-PLA) has been demonstrated by a reactive-extrusion process. The grafting reaction can also be performed in other reaction devices as long as the necessary mixing of PLA and maleic anhydride (MA) and any other reactive ingredients is achieved and enough energy is provided to effect the grafting reactions. The grafted PLA may contain from 0.1 to 5 mol % of grafted MA. Preferably, the grafted PLA contains 0.2 to 1 mol % of grafted MA, and most preferably 0.3 to 0.6 mol % of grafted MA.

Other reactive ingredients which may be added to the compositions of this invention include initiators such as Lupersol® 101, a liquid, organic peroxide available from Elf Atochem North America, Inc. of Philadelphia, USA. Free radical initiators useful in the practice of this invention include acyl peroxides such as benzoyl peroxide; dialkyl; diaryl; or aralkyl peroxides such as di-t-butyl peroxide; dicumyl peroxide; cumyl butyl peroxide; 1,1 di-t-butyl peroxy-3,5,5-trimethylcyclohexane; 2,5-dimethyl-2,5-di(t-butylperoxy)hexane; 2,5-dimethyl-2,5-bis(t-butylperoxy)hexyne-3 and bis(a-t-butyl peroxyisopropylbenzene); peroxyesters such as t-butyl peroxypivalate; t-butyl peroctoate; t-butyl perbenzoate; 2,5-dimethylhexyl-2,5-di(perbenzoate) t-butyl di(perphthalate); dialkyl peroxymonocarbonates and peroxydicarbonates; hydroperoxides such as t-butyl hydroperoxide, p-methane hydroperoxide, pinane hydroperoxide and cumene hydroperoxide and ketone peroxides such cyclohexanone peroxide and methyl ethyl ketone peroxide. Azo compounds such as azobisisobutyronitrile may also be used.

Furthermore, other components known in the art may be added to the graft polymers of this invention to further enhance the properties of the final material. For example, polyethylene glycol may be further added to improve melt viscosity. Other additives may also be incorporated to provide specific properties, as desired. For example, anti-static agents, organo-modified clays, pigments, colorants and the like may be incorporated into the polymer composition. Additionally, processing characteristics may be improved by incorporating lubricants or slip agents into the polymer blends of the invention. All of these additives are generally used in relatively small amounts, usually less than 3% by weight of the final composition.

Melt blending is the preferred method used to combine the PLA and water soluble polymer according to the present invention. More particularly, reactive melt processing through reactive extrusion is preferred.

The melt blending of the polylactide and biodegradable polymers is subjected to thermo-mechanical deformation in a suitable kneader, such as a Bradender®-type internal mixer, a roll mill, a single or multiple screw extruder, or any other mechanical mixing device which can be used to mix, compound, process or fabricate polymers. A particularly desirable reaction device is an extruder having one or more ports. In a preferred embodiment, the reaction device is a co-rotating, twin-screw extruder, such as a ZSE 18 HP twin-screw extruder manufactured by Leitritz GmbH, Nuremberg (Germany). This extruder allows multiple feeding and venting ports.

The presence of PLA or modified PLA (which is PLA plasticized with commonly used plasticizers such triacetin, tripropionin, triethyl citrate, etc.) in blends used to make films and fibres reduces the water sensitivity of the neat biodegradable water-soluble polymers. MA-g-PLA grafted is preferred for enhanced compatibility between PLA and biodegradable water-soluble polymers by means of a reactive compatibilization process performed by reactive extrusion. Such compatibilization aims at improving both processability and thermo-mechanical properties of the final material. It is possible to use the blends to make other shapes than films or fibres and to thermally form the blends into complex shapes.

EXAMPLES

The present invention is illustrated in greater detail by the following specific Examples. It is to be understood that these Examples are illustrative embodiments and that this invention is not to be limited by any of the Examples.

Example 1

Maleic anhydride-grafted PLA was produced using a Leistritz ZSE 18 HP. Prior to introduction into the extruder, dried PLLA pellets were premixed with 3 wt % of maleic anhydride and 0.5 wt % of Lupersol® 101. Maleation was then conducted at 190° C. using a low screw speed (50 rpm) in order to increase the residence time.

The MA-g-PLLA thus obtained was purified and the MA amount assessed by titration. The MA content was estimated at 0.45 wt %.

Example 2

Various PLLA/HEC 50/50 w/w compositions were obtained by melt-compounding polymer pellets and additives (plasticizers, compatibilizers) at 190° C. using a Brabender bench-scale kneader (model 50 EHT, 80 cm³ free volume) equipped with cam blades for 3 minutes at 30 rpm, followed by 6 minutes at 60 rpm. HEC was obtained from Merck. Glyplast® was obtained from Condensa Quimica, Spain. Polyethylene (Mw=200) was obtained from Fluka. Before processing, polymers and additives were dried overnight at 80° C. in a ventilated oven.

Films with a thickness of 500 μm were then prepared by compression moulding at 190° C. using an Agila PE20 hydraulic press (low pressure for 120 seconds without degassing cycle, followed by a high-pressure cycle at 150 bar for 180 seconds and cooling by tap water at 50 bar for 180 seconds). The mechanical properties of the PLLA/HEC 50/50 (w/w) blends (plasticized with 20 wt % Glyplast®) were assessed by tensile testing. MA-grafted PLLA were used as compatibilizers. Results are reported in Table 1 below.

TABLE 1

| Sample | MA-g-PLA (wt %) | Young modulus (MPa) | Stress at break (MPa) | Strain at break (%) |
|---|---|---|---|---|
| 1 | 0 | 977 ± 33 | 15.3 ± 0.5 | 3 ± 1 |
| 3 | 4 | 817 ± 68 | 12.8 ± 1.0 | 22 ± 4 |
| 4 | 8 | 878 ± 99 | 13.7 ± 0.7 | 23 ± 4 |

As observed, in the absence of compatibilizer, the blend was quite brittle. The addition of MA-g-PLLA improved the ultimate elongation but did not modify the tensile strength. The best results were obtained by using 4 wt % MA-g-PLLA.

Example 3

The plasticization of hydroxyethyl cellulose (HEC) was considered. For that purpose, a preparative method commonly used for starch plasticization was successfully adapted. Mixtures of HEC and plasticizers were prepared at room temperature and water was added for some compositions. These premixes were left to swell overnight. Next, compositions were melt-processed via Brabender at 110° C. for 6 minutes. Various compositions were prepared in order to investigate the effect of both water and plasticizer content. The samples prepared are listed below:

HEC/Glycerol 60/40
HEC/Glycerol 70/30
HEC/Glycerol/water 60/30/10
HEC/Glycerol/water 60/25/15
HEC/PEG 200/water 60/30/10
HEC/PEG 400/water 60/30/10
HEC/Glycerol/water 60/30/10

For each composition, a gel-like structure was obtained which seemed indicate effective HEC plasticization.

Example 4

Plasticized HEC was used to prepare PLLA/HEC blends. Plasticized PLLA/HEC 40/60 compositions were prepared by melt-blending in Brabender at 190° C. Both an uncompatibilized blend and a MA-g-PLLA-based composition were prepared and 500 μm-thick films were obtained by compression moulding.

Figure 1:
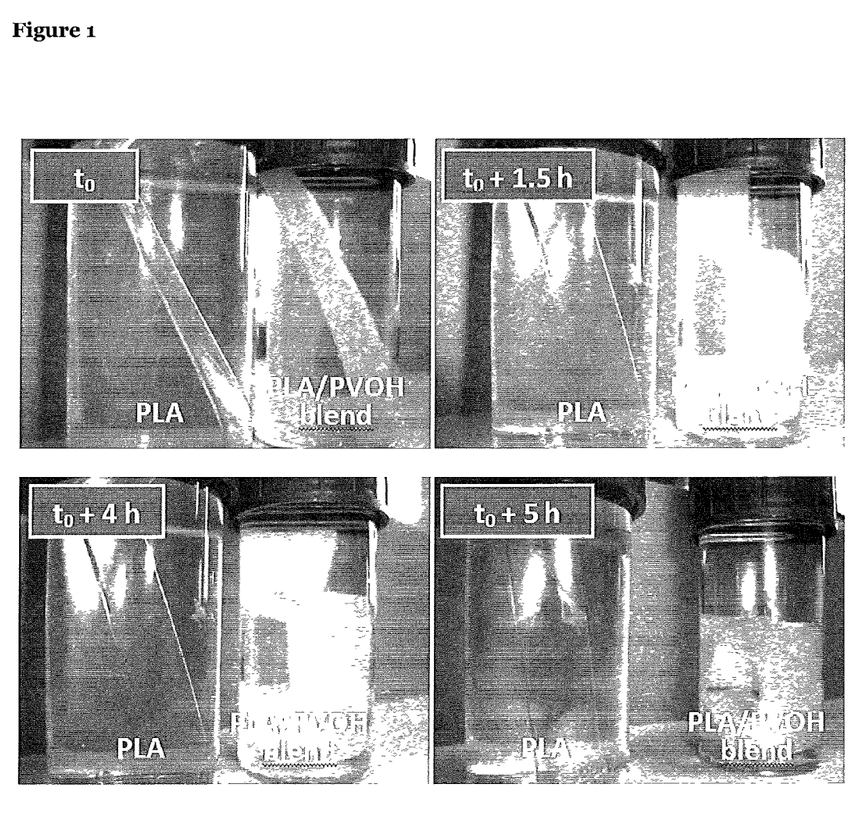
FIG. 1 is a series of photographs of films of neat PLA and a PLA and PVOH 50/50 w/w blend illustrating the dispersion in water of polymer blends according to the present invention.
Figure 2:
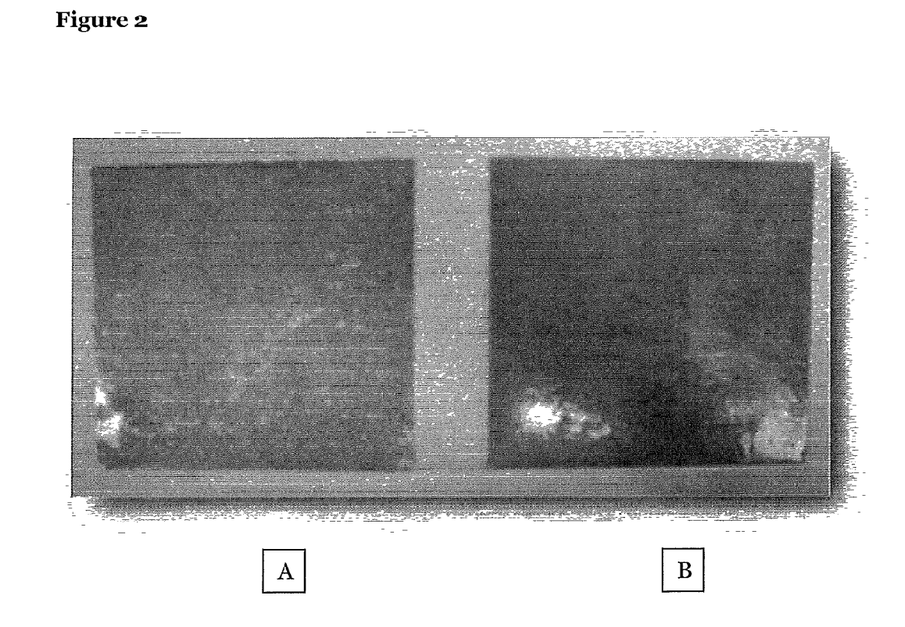
FIG. 2 shows 500 μm-films of plasticized PLLA/HEC 40/60 blends which are: a) uncompatibilized; and b) compatibilized with 10 wt % MA-g-PLLA.

FIG. 2 shows the so-prepared films and evidences the effect of MA-g-PLLA on their morphology. It may be observed that an inhomogeneous surface was obtained in the absence of a compatibilizer.

The mechanical properties of these films were investigated by means of tensile testing and the ultimate properties of both the uncompatibilized and the MA-g-PLLA-based blends were characterized. It was revealed that adding MA-g-PLLA increased the tensile strength of the blend by approximately 30% and doubled the strain at break. These results show the effect of compatibilizer on mechanical performances of PLLA/HEC blends. Indeed, compatibilization with MA-g-PLLA increased both the Young modulus and tensile strength in comparison with uncompatibilized blend.

Example 5

Various PLLA/PVOH 50/50 w/w compositions were obtained by melt-compounding polymer pellets and additives (plasticizers, compatibilizers) at 190° C. using a Brabender bench-scale kneader (model 50 EHT, 80 cm³ free volume) equipped with cam blades for 3 minutes at 30 rpm, followed by 6 minutes at 60 rpm. PVOH (grade Mowiol® 23-88) was provided by Kuraray GmbH, Germany. Glyplast® was obtained from Condensa Quimica, Spain. Polyethylene (Mw=200) was obtained from Fluka. Before processing, the polymers and additives were dried overnight at 80° C. in a ventilated oven.

Films having a thickness of 500 μm were then prepared by compression moulding at 190° C. using an Agila PE20 hydraulic press (low pressure for 120 seconds without degassing cycle, followed by a high-pressure cycle at 150 bar for 180 seconds and cooling by tap water at 50 bar for 180 seconds).

The mechanical properties of the PLLA/PVOH 50/50 (w/w) blends were assessed by tensile testing. MA-grafted PLLA was used as a compatibilizer. The results are reported in Table 2 below.

TABLE 2

| Sample | Plasticizer (20 wt %) | MA-g-PLLA (wt %) | Young modulus (MPa) | Stress at break (MPa) | Strain at break (%) |
|---|---|---|---|---|---|
| 1 | None | 0 | 2723 ± 162 | 35.0 ± 4.2 | 2 ± 1 |
| 2 | None | 8 | 2679 ± 157 | 50.3 ± 4.6 | 3 ± 1 |
| 4 | Glyplast ® | 8 | 1169 ± 103 | 15.5 ± 2.1 | 16 ± 6 |
| 5 | PEG | 8 | 877 ± 81 | 13.1 ± 1.8 | 4 ± 1 |

Thus, the addition of MA-g-PLLA enhances the tensile strength of blends while ultimate elongation was not affected. The addition of Glyplast® improved elongation, while PEG was ineffective.

Example 6

MA-g-PLLA was used as compatibilizer for PLLA/PVOH blends. Such compatibility enhancement has been attributed to the formation of covalent bonds between PVOH and PLA leading to grafted copolymers able to improve interface quality.

Proof that these copolymers are effectively produced during the melt processing of blends has been provided through solubilisation tests. For that purpose, both uncompatibilized and MA-g-PLA based PLLA/PVOH 60/40 blends were considered. They were immersed in water and the water-soluble fractions recovered after filtration and drying. Next, these fractions were immersed in chloroform and only the soluble parts were considered for NMR characterization. This approach allowed isolation of the potentially formed copolymers (as these are the only components soluble in both water and chloroform).

Figure 3:
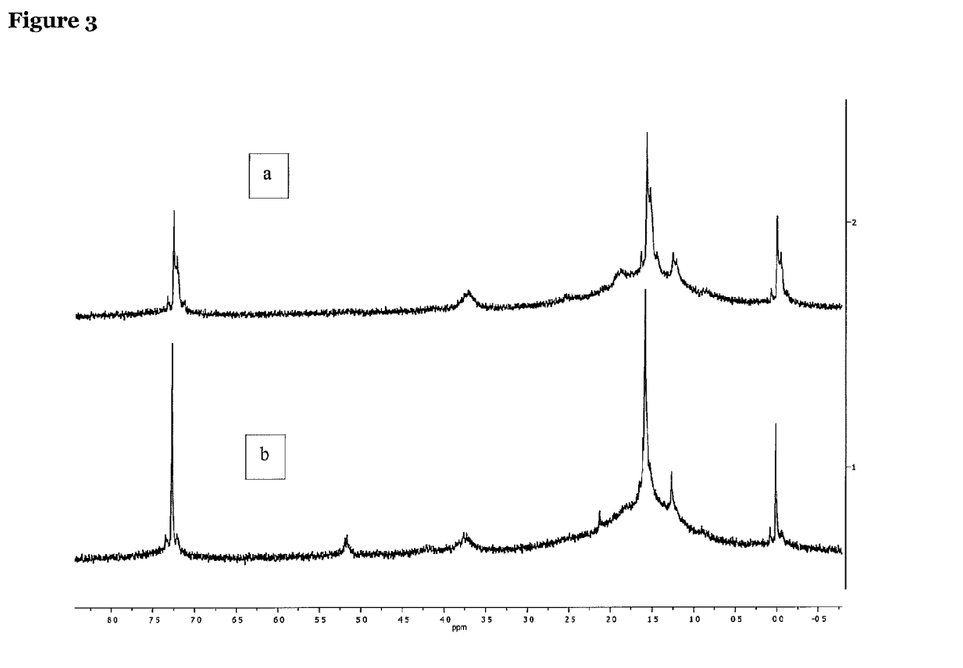
FIG. 3 shows $^{1}H$ NMR spectra of PLLA/PVOH 60/40 (w/w) blends which are: a) uncompatibilized; and b) compatibilized with MA-g-PLA.

The $^1$H NMR spectra are shown in FIG. 3. As may be observed from the "b" spectrum shown in FIG. 3, the presence of PLA signals (mainly at approximately 5.3 ppm) attest for the formation of grafted copolymers.

Example 7

Plasticization of PVOH was carried out using a Leitritz ZSE 18 HP twin screw extruder. Glycerol was used as a plasticizer. Glycerol was obtained from Sigma-Aldrich. PVOH was processed at 210° C. using a screw speed of 30 rpm. Glycerol was introduced through the second barrel zone and the feed was controlled by a liquid feeder. In this way, it was possible to prepare PVOH composition plasticized with 33.3 wt % glycerol.

The so-obtained plasticized PVOH was used for the preparation of PLLA/PVOH 50/50 w/w blends. These compositions were prepared in the absence of compatibilizer, as well as in the presence of 8 wt % MA-g-PLA as compatibilizer. The polymer blends were processed at 190° C. using a screw speed of 50 rpm. Next, fibres of the polymer blends were obtained by using a DSM mini-extruder equipped with the fibre spinning device. Only compositions containing MA-g-PLA have been able to be fibre-processed which attest the ability of MA-g-PLLA for improving polymer blend processability.

Example 8

Monofilaments based on PLLA and PVOH were produced. For that purpose, a DSM vertical mini-extruder equipped with a dedicated monofilament die was used. The compositions were prepared at 190° C. using a screw speed of 120 rpm and mixing time of 4 minutes. The prepared samples were:
PLLA (neat polymer)
PLLA/PVOH 50/50 (w/w)+10 wt % MAgPLA
PLLA/PVOH 40/60 (w/w)+10 wt % MAgPLA The use of both a circular die (0.5 mm diameter) and the DSM spinning unit allowed preparation of approximately 0.4 mm diameter monofilaments.

Table 3 reports the tensile properties of the monofilaments. It is noteworthy that the testing conditions used were similar to those considered for film testing (crosshead speed: 20 mm·min$^{-1}$, gauge length 25.4 mm).

As observed, PLLA-based monofilaments exhibited higher stiffness than PBS-based samples. In both case, the increase of PVOH content allowed for improving both tensile strength and ultimate elongation.

TABLE 3

Tensile properties of PVOH-based monofilaments

| Entry | Polymer (wt %) PLLA | Polymer (wt %) PVOH | Compatibilizer | Young modulus (MPa) | Stress at break (MPa) | Strain at break (%) |
|---|---|---|---|---|---|---|
| 1 | 100 | 0 | None | 3224 ± 665 | 183.8 ± 7.2 | 78 ± 15 |
| 2 | 50 | 50 | MAgPLA[a] | 1359 ± 153 | 37.1 ± 8.9 | 7 ± 2 |
| 3 | 40 | 60 | MAgPLA[a] | 1329 ± 268 | 56.8 ± 9.3 | 36 ± 7 |

[a]MAgPLA included in an amount of 10 wt %

Figure 4:
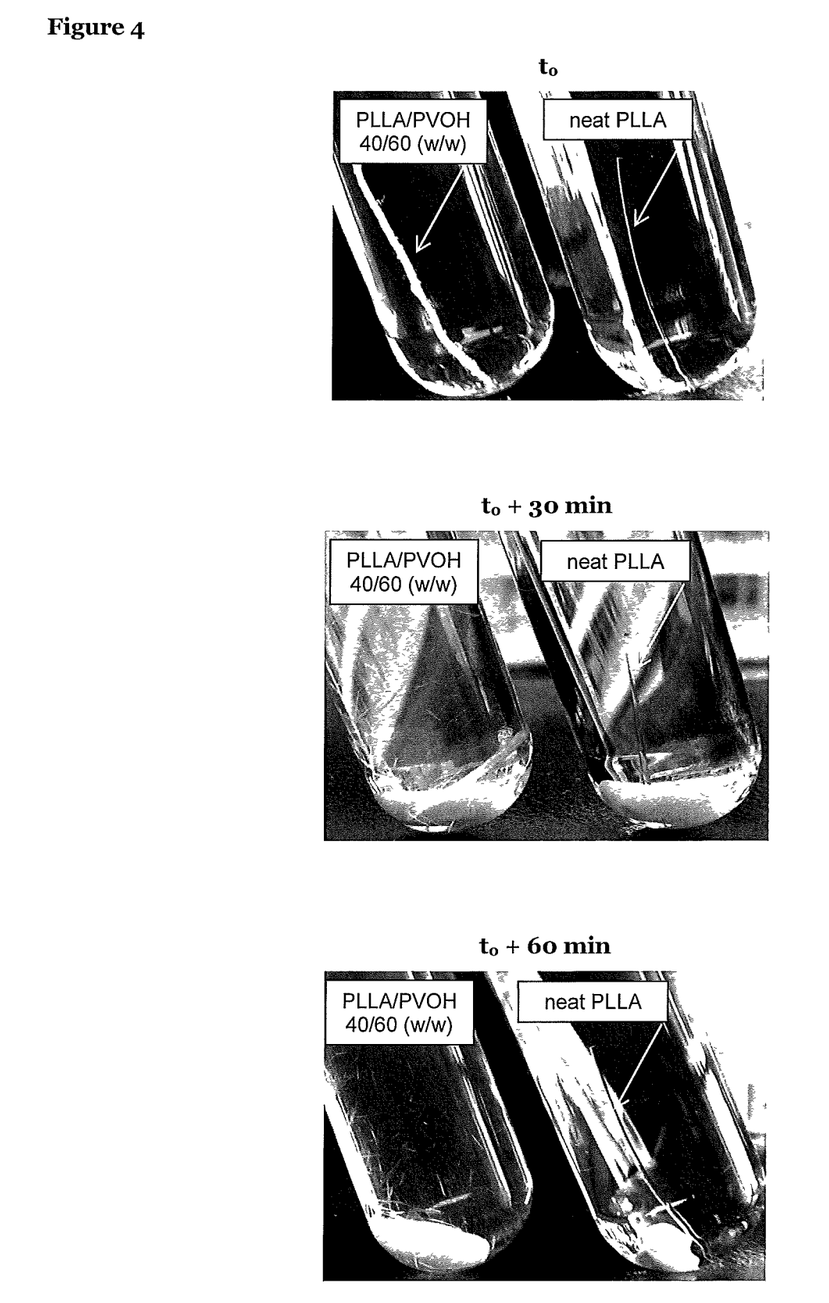
FIG. 4 is a series of photographs of mono-filaments of neat PLA and a PLA and PVOH 40/60 w/w blend illustrating the fragmentation and dispersion in water of the polymer blend composition.

FIG. 4 is a series of photographs of mono-filaments of neat PLA and a PLA and PVOH 40/60 w/w blend illustrating the fragmentation and dispersion in water of the polymer blend composition.

In order to address various issues and advance the art, the entirety of this disclosure shows by way of illustration various embodiments in which the claimed invention(s) may be practiced and provide for superior polymer compositions. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. An apparatus, comprising: a smoking article filter element including water-dispersive fibres formed from a composition comprising a blend of polylactide (PLA) and a water soluble polymer, wherein the blend further comprises a reactive compatibilizer in an amount sufficient to compatibilize the blend.

2. The apparatus as claimed in claim 1, wherein the water soluble polymer is selected from the group consisting of: polyvinyl alcohol (PVOH), carboxymethyl cellulose (CMC), hydroxyethyl cellulose (HEC), hydroxypropyl cellulose (HPC), methyl cellulose (MC) and ethyl cellulose (EC), xanthan and pullulan, and blends thereof.

3. The apparatus as claimed in claim 2, wherein the water soluble polymer is one of PVOH and HEC.

4. The apparatus as claimed in claim 1, wherein the water soluble polymer is included in an amount within the range of 30 to 70 wt % of the blend of polylactide and water soluble polymer.

5. The apparatus as claimed in claim 1, wherein the reactive compatibilizer is a grafted copolymer.

6. The apparatus as claimed in claim 5, wherein the grafted copolymer is a copolymer of PLA and a compound reactive towards hydroxyl groups.

7. The apparatus as claimed in claim 6, wherein the grafted copolymer is maleic anhydride-grafted polylactide (MA-g-PLA).

8. The apparatus as claimed in claim 1, wherein the composition further comprises at least one of 2,5-bis(tert-butylperoxy)-2,5-dimethylhexane, an acyl peroxide, an aralkyl peroxide, a peroxyester, a dialkyl peroxymonocarbonate, a peroxydicarbonate, a hydroperoxide, a ketone peroxide, and an azo compound.

9. The apparatus as claimed in claim 1, wherein the composition further comprises at least one additional component selected from the group consisting of agents improving the melt viscosity of the composition, anti-static agents, organo-modified clays, pigments, colorants, lubricants and slip agents.

10. The apparatus as claimed in claim 9, wherein the additional components are included in an amount of less than 3 weight percent of the final composition.

11. A method of preparing the apparatus as claimed in claim 1, the method comprising forming water-dispersive fibres from the composition comprising a blend of polylactide and a water soluble polymer, and processing through reactive extrusion of a blend of polylactide, a water soluble polymer and a reactive compatibilizer.

12. The method as claimed in claim 11, wherein the polylactide, water soluble polymer and reactive compatibilizer are melt blended.

13. The method as claimed in claim 11, wherein the reactive compatibilizer is maleic anhydride-grafted polylactide prepared by reactive extrusion of PLA and maleic anhydride.

14. The method as claimed in claim 13, wherein the maleic anhydride-grafted polylactide comprises from 0.1 to 5 mot % of grafted maleic anhydride.

15. The method as claimed in claim 11, wherein compatibilization involves the formation of chemical covalent bonds.

16. The apparatus as claimed in claim 4, wherein the water soluble polymer is included in an amount within the range of 40 to 60 wt % of the blend of polylactide and water soluble polymer.

17. The apparatus as claimed in claim 4, wherein the water soluble polymer is included in an amount within the range of 45 to 55 wt % of the blend of polylactide and water soluble polymer.

18. The method as claimed in claim 14, wherein the maleic anhydride-grafted polylactide comprises from 0.2 to 1 mol % of grafted maleic anhydride.

19. The method as claimed in claim 14, wherein the maleic anhydride-grafted polylactide comprises from 0.3 to 0.65 mol % of grafted maleic anhydride.

* * * * *

UNITED STATES PATENT AND TRADEMARK OFFICE
CERTIFICATE OF CORRECTION

| | | |
|---|---|---|
| PATENT NO. | : 9,085,660 B2 | Page 1 of 1 |
| APPLICATION NO. | : 14/008968 | |
| DATED | : July 21, 2015 | |
| INVENTOR(S) | : Robert Quintana et al. | |

It is certified that error appears in the above-identified patent and that said Letters Patent is hereby corrected as shown below:

In the Claims:

Column 12, line 8, Claim 14

"mot%" should read -- mol% --

Signed and Sealed this
Twelfth Day of January, 2016

Michelle K. Lee
*Director of the United States Patent and Trademark Office*